(12) United States Patent
Fukada

(10) Patent No.: US 8,963,531 B2
(45) Date of Patent: Feb. 24, 2015

(54) OUTPUT CONTROL APPARATUS OF SOLAR CELL

(75) Inventor: Yoshiki Fukada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/148,855

(22) PCT Filed: Oct. 6, 2010

(86) PCT No.: PCT/JP2010/067589
§ 371 (c)(1),
(2), (4) Date: Aug. 10, 2011

(87) PCT Pub. No.: WO2012/046317
PCT Pub. Date: Apr. 12, 2012

(65) Prior Publication Data
US 2013/0181691 A1    Jul. 18, 2013

(51) Int. Cl.
*G05F 5/00*    (2006.01)
*G05F 1/00*    (2006.01)
(Continued)

(52) U.S. Cl.
CPC . *G05F 1/67* (2013.01); *H02J 3/385* (2013.01); *Y02E 10/58* (2013.01); *Y10S 323/906* (2013.01)
USPC .............................. 323/299; 323/222; 323/906

(58) Field of Classification Search
USPC ................. 323/265, 266, 282–286, 351, 906, 323/208–211, 222–226, 269–275, 276–278, 323/299, 303; 363/74, 78, 89, 79, 80, 95, 363/97, 98, 101, 124, 126, 127; 320/101, 320/102, 135, 136, 69, 71
See application file for complete search history.

(56) References Cited

U.S. PATENT DOCUMENTS 4,695,785 A * 9/1987 Mieth et al. .................... 323/222
5,659,465 A * 8/1997 Flack et al. ..................... 363/71
5,714,869 A * 2/1998 Tamechika et al. ........... 320/101
(Continued)

FOREIGN PATENT DOCUMENTS

JP    A-7-191767    7/1995
JP    A-7-281775    10/1995
(Continued)

OTHER PUBLICATIONS

Ross et al.; "Efficiency of hot-carrier solar energy converters;" *J. Appl. Phys.*; May 1982; pp. 3813-3818; vol. 5, No. 3; American Institute of Physics.
(Continued)

*Primary Examiner* — Adolf Berhane
*Assistant Examiner* — Carlos Rivera-Perez
(74) *Attorney, Agent, or Firm* — Oliff PLC

(57) ABSTRACT

An output control apparatus of a solar cell is provided with: a first controlling device for sequentially increasing a load for extracting the output from a load in an increase area in which the output increases with respect to an increase in the load; a detecting device for detecting a decrease in the output with respect to the increase in the load in a process of sequentially increasing the load; and a second controlling device for rapidly reducing the load to an initial load which belongs to the increase area in comparison with the process of sequentially increasing the load in cases where a change in the output is detected, the first controlling device sequentially increasing the load again after the load is reduced to the initial load.

10 Claims, 5 Drawing Sheets

(51) Int. Cl.
*G05F 1/67* (2006.01)
*H02J 3/38* (2006.01)

(56) References Cited

U.S. PATENT DOCUMENTS

| | | | | |
|---|---|---|---|---|
| 5,932,994 | A * | 8/1999 | Jo et al. | 323/222 |
| 6,844,739 | B2 * | 1/2005 | Kasai et al. | 324/611 |
| 2008/0191560 | A1 * | 8/2008 | Besser et al. | 307/126 |
| 2010/0208501 | A1 * | 8/2010 | Matan et al. | 363/95 |

FOREIGN PATENT DOCUMENTS

| | | |
|---|---|---|
| JP | A-2001-60120 | 3/2001 |
| JP | A-2004-280220 | 10/2004 |
| JP | A-2006-201827 | 8/2006 |

OTHER PUBLICATIONS

Takeda et al.; "Hot carrier solar cells operating under practical conditions;" *Journal of Applied Physics*; 2009; pp. 074905-1-074905-10; vol. 105; American Institute of Physics.

Aliberti et al.; Investigation of theoretical efficiency limit of hot carriers solar cells with a bulk indium nitride absorber; *Journal of Applied Physics*; 2010; pp. 094507-1-094501-10; vol. 108; American Institute of Physics.

International Search Report dated Dec. 21, 2010 in International Application No. PCT/JP2010/067589 (with translation).

Esram, Chapman, Comparison of Photovoltaic Array Maximum Power Point Tracking Techniques, IEEE Transactions on Energy Conversion, Jun. 2007, pp. 439-449, vol. 22, No. 2.

Green, Third Generation Photovoltaic: Assessment of Progress Over the Last Decade, Photovoltaic Specialists Conference (PVSC), 2009, 2009 34th IEEE, pp. 000146-000149.

* cited by examiner (a transition of the output point in the case where the prior art is applied)

(a)

(b)

OUTPUT CONTROL APPARATUS OF SOLAR CELL

TECHNICAL FIELD

The present invention relates to an output control apparatus of a solar cell for efficiently extracting output from the solar cell.

BACKGROUND ART

As this type of apparatus, there has been suggested an apparatus for extracting maximum output from the solar cell (e.g. refer to a patent document 1). According to a solar power generation system and its maximum power point tracking control method disclosed in the patent document 1, it is possible to detect a maximum power operating point, certainly and highly accurately, by instantly scanning the IV characteristics of the solar cell and by making solar cell current conform with an optimum solar cell current.

Incidentally, as for an electric power control method of extracting a maximum electric power from a cell power supply, it is disclosed even in a patent document 2.

Moreover, a non-patent document 1 discloses the operation principle of a so-called hot carrier solar cell as a type of the solar cell. Moreover, a non-patent document 2 discloses a mathematical and analytical technique for the hot carrier solar cell.

PRIOR ART DOCUMENT

Patent Document

Patent document 1: Japanese Patent Application Laid Open No. 2004-280220
Patent document 2: Japanese Patent Application Laid Open No. Hei 7-191767

Non-Patent Document

Non-Patent document 1: R. T. Ross and A. J. Nozik, Journal Of Applied Physics 53, 1982
Non-Patent document 2: Takeda et al, Journal Of Applied Physics 105 074905, 2009

DISCLOSURE OF INVENTION

Subject to be Solved by the Invention

Some solar cells have a spike-like corrugated portion in the IV characteristics, due to an extremely rapid, temporal drop in an area which is in the vicinity of a maximum output point and in which a power point is on a high-load side beyond a maximum power point, as opposed to known PN-junction solar cells. In this type of solar cell, in some cases, the maximum power point when the load is changed from the high-load side to a low-load side is less than the maximum power point when the load is changed from the low-load side to the high-load side.

Here, the patent document 1 mentions that the IV characteristics are instantly scanned. From the description that an output current is changed from zero to a short-circuit current, the direction of change in the load when scanning the IV characteristics is from the high-load side to the low-load side. Moreover, the patent document 1 does not mention nor suggest the solar cell having the spike-like corrugated portion of this type in the IV characteristics, in the first place.

Therefore, if the method disclosed in the patent document 1 is adopted, output control is likely continued without a detection of the true maximum power point, depending on the type of the solar cell. In other words, the method disclosed in the patent document 1 has such a technical problem that the output is hardly efficiently extracted from the solar cell. Moreover, this problem is also the same for the patent document 2.

Incidentally, such a technical problem is also the same for a conventional output control method based on so-called hill climbing in which efforts are made to maintain the output point of the solar cell in the vicinity of the maximum power point while searching for the maximum power point simply by reciprocally changing the load in a load area in the vicinity of the maximum power point. That is because even in this case, it is hard to detect the true maximum power point of the solar cell and because there will be highly likely a loss of time until the detection even if the true maximum power point of the solar cell can be detected.

In view of the aforementioned problems, it is therefore an object of the present invention to provide an output control apparatus of a solar cell, capable of extracting an electric power from the solar cell, highly efficiently.

Means for Solving the Subject

The above object of the present invention can be achieved by an output control apparatus of a solar cell for controlling output of the solar cell, the output control apparatus provided with: a first controlling device for sequentially increasing a load for extracting the output from a load in an increase area in which the output increases with respect to an increase in the load; a detecting device for detecting a decrease in the output with respect to the increase in the load in a process of sequentially increasing the load; and a second controlling device for rapidly reducing the load to an initial load which belongs to the increase area in comparison with the process of sequentially increasing the load in cases where a change in the output is detected, the first controlling device sequentially increasing the load again after the load is reduced to the initial load.

The output control apparatus of the solar cell of the present invention conceptually includes: an apparatus for controlling an extraction aspect in extracting the output of the solar cell according to the load of a proper load apparatus (strictly speaking, which means the magnitude of the load), physically, electrically, mechanically or chemically; and an apparatus in which various accessory apparatuses, such as the load apparatus described above, are attached to the aforementioned control apparatus.

The output control apparatus of the solar cell of the present invention can adopt forms of various computer systems, various micro computer apparatuses or controllers, and various processing units such as a single or a plurality of ECUs (Electronic Controlled Unit), which can include one or more CPUs (Central Processing Unit), MPUs (Micro Processing Unit), various processors or various controllers, or furthermore, various memory devices such as a ROM (Read Only Memory), a RAM (Random Access Memory), a buffer memory or a flash memory, as occasion demands, as a preferred form. However, as long as the aforementioned concept is ensured, the practical aspect of the output control apparatus of the solar cell of the present invention is not limited at all.

Incidentally, the load of the load apparatus described above may be literally the load (direct load) of various electric drive type auxiliaries and various storage battery devices as the load apparatus, or it may be the control state, drive state, and the like (indirect load) of various electrical circuits, devices, elements, or the like, which can have substantially the same meaning as the load of the load apparatus viewed from the solar cell, in terms of system configuration.

According to the output control apparatus of the solar cell of the present invention, in its operation, the aforementioned load is sequentially increased, gradually or continuously, from a load point which belongs to the increase area as a load area in which the output increases with respect to the increase in the load, by the operation of the first controlling device. At this time, the control target of the first controlling device is not necessarily the load as long as it can lead to the increase in the load. For example, an electric current, voltage, or the like may be controlled. If such an alternative control element is used, it is desirable that this type of alternative control element corresponding to the load in a one-to-one, one-to-many, many-to-one or many-to-many manner is gauged as a type of correlation, on the basis of experiments, experiences, theories, or simulations in advance, as a preferred form.

Here, the maximum output point of the solar cell, which means the output point (also referred to as an operating point) of the solar cell at which maximum output (maximum electric power) is extracted from the solar cell, is in a load area between an open load and a short-circuit load if the output point is defined by the load point. Therefore, in the process of sequentially increasing the load from the increase area, necessarily, there is the decrease in the output, with this maximum output point at the boundary. According to the output control apparatus of the solar cell of the present invention, the decrease in the output with respect to the increase in the load is detected by the operation of the detecting device.

At this time, as long as the decrease in the output with respect to the increase in the load can be detected, the detection aspect of the detecting device is not limited at all. For example, the detecting device may estimate the output of the solar cell on the basis of the output voltage and the output current of the solar cell, thereby detecting the change to the reduction side. If the detecting device can detect a change in the load area from the output voltage or the output current, the change in the load area may be detected on the basis of the change in either one of them.

By the way, in the solar cell, depending on its type, a relation between the output current and the output voltage obtained with respect to the change in the load (hereinafter referred to as "IV characteristics" as occasion demands) varies depending on the direction of change in the load. For example, if the output voltage rapidly decreases at a load point which is on the higher-load side than the maximum output point and which is in the vicinity of the maximum output point, or if the output voltage rapidly increases after this type of rapid decrease in the output voltage (in this case, the IV characteristics can have a type of spike-like peak waveform), the load point and the output point of the solar cell do not have a unique relation in terms of the IV characteristics (i.e. there can be a plurality of output points of the solar cell with respect to one load point) in this type of transient load area. Thus, there can be a situation in which the maximum output point when the load is changed from the high-load side to the low-load side is different from the maximum output point when the load is changed from the low-load side to the high-load side. More specifically, the former is smaller than the latter.

In other words, in the case of such a solar cell, in so-called hill climbing in which the maximum output point is searched for by increasing or reducing the load near the maximum output point, it is hard to efficiently maintain the output point of the solar cell at the maximum output point or at an output point near the maximum output point. That is because in such a change in the load that is from the load point on the high-load side which exceeds the maximum output point to the load point in the increase area which is less than the maximum output point, the output point of the solar cell will never reach the true maximum output point and also because a time required for the control hardly contributes to the efficient extraction of the output from the solar cell.

In contrast, according to the output control apparatus of the solar cell of the present invention, if the decrease in the output is detected with respect to the increase in the load, the load is rapidly reduced to the initial load by the operation of the second controlling device. Here, the wording "rapidly" means that it is more rapid than the process that the first controlling device sequentially increases the load. Namely, the present invention is based on the discovery that there is such a solar cell that cannot obtain the maximum output point even if the load is changed from the high-load side to the low-load side; in other words, the present invention is based on the discovery that there is no technical meaning in changing the load from the high-load side to the low-load side while gauging the output state of the solar cell as in the case of the change from the low-load side to the high-load side, like the conventional "hill climbing", when extracting the output from the solar cell high efficiently.

The operation of reducing the load by the second controlling device in the output control apparatus of the solar cell of the present invention has no direct significance regarding the extraction of the maximum output or its corresponding output from the solar cell, and its technical position is different from the operation of increasing the load by the first controlling device in the first place. More specifically, the operation of reducing the load by the second controlling device has a meaning of promptly reducing the load viewed from the solar cell side, to the proper initial load, as a starting point at which the load is sequentially increased in order to obtain the maximum output or its corresponding output. Therefore, the wording "rapidly" associated with the second controlling device widely includes, as its concept, that it is more rapid than cases where the first controlling device increases the load. More preferably, the wording "rapidly" means that the load is instantly changed to the initial load set in advance or set at each time, as occasion demands.

As described above, according to the output control apparatus of the solar cell of the present invention, the direction of change in the load for extracting the output from the solar cell is substantially limited to a direction in which the maximum output can be extracted from the solar cell (a direction to increase the load). Alternatively, in one control period which is defined by the operation of the first controlling device in which the load is increased from the load point in the increase area and by the operation of the second controlling device in which the load is rapidly reduced to the initial load in the increase area after the detection of the decrease in the output, a proportion of the operation of the first controlling device is set to be sufficiently larger than a proportion of the operation of the second controlling device. Therefore, it is certainly efficient in the point that the wasteful load change from the high-load side to the low-load side, which can occur if the output is extracted from such a solar cell that the IV characteristics differ depending on the direction of change in the load, is eliminated as much as possible, even for any existing output control which does not take into account the difference in the IV characteristics by the direction of change in the load.

Incidentally, in the aforementioned one control cycle, the output point of the solar cell necessarily passes through the maximum output point or its corresponding output point. Therefore, in an output control process associated with the output control apparatus of the solar cell of the present invention, the maximum output point of the solar cell is not necessarily specified.

In one aspect of the output control apparatus of the solar cell of the present invention, the second controlling device rapidly reduces the load by increasing a rate of change in the load in comparison with the process of sequentially increasing the load (claim 2).

According to this aspect, by increasing the rate of change in the load in comparison with the process of sequentially increasing the load, it is possible to realize the operation of the second controlling device in which the load is rapidly reduced, relatively easily.

Incidentally, the rate of change in the load means the amount of change in the load per unit time. Thus, if a time required to change the load at that time point to a target load is constant or substantially constant regardless of the deviation of the load, the rate of change in the load may be controlled by the amount of change in the load, i.e. the magnitude of the target load in this case. Moreover, preferably, the target load in this case may be the aforementioned initial load.

In another aspect of the output control apparatus of the solar cell of the present invention, the solar cell is a hot carrier solar cell (claim 3).

The applicant has reached the conclusion, from the result of their years of research, that the hot carrier solar cell causes the rapid drop in the output voltage in the vicinity of the maximum output point on the higher-load side than the maximum output point. Therefore, if the output control apparatus of the solar cell of the present invention is applied to the output control of the hot carrier solar cell as a preferred one form, it remarkably produces an effect.

In another aspect of the output control apparatus of the solar cell of the present invention, it is further provided with a specifying device for specifying the load which causes the decrease in the output (claim 4).

According to this aspect, the load which causes the decrease in the output is specified by the specifying device in the process that the load sequentially increases (preferably, the output current of the solar cell sequentially decreases). Here, the decrease in the output occurs when the output point of the solar cell exceeds the maximum output point, so that this "load which causes the decrease in the output" has a meaning equivalent to the maximum output point. In other words, the specifying device uniquely specifies the maximum output point of the solar cell by specifying the load which causes the decrease in the output. In view of this point, hereinafter, the load specified by the specifying device is referred to as the "maximum output point", as occasion demands. Incidentally, the wording "specify" means to eventually determine it as a reference value in terms of control, and there may be various practical aspects of the specification, such as detection, calculation, derivation, identification, estimation, selection, obtainment, and the like.

If the maximum output point of the solar cell is specified, the width of change in the load when the first controlling device sequentially increases the load can be changed, more efficiently. Thus, it is possible to extract the output from the solar cell, more highly efficiently, which is useful in practice.

Incidentally, this maximum output point is not necessarily the true maximum output point, but it may be a realistic or provisional maximum output point according to the width of change in the load in the control of the first controlling device. Even in the case of this type of realistic or provisional maximum output point, as long as the direction of change in the load is a direction in which the true maximum output point can be reached, the practically useful effect of the present invention can be ensured.

Incidentally, in an aspect in which the specifying device is provided, the first controlling device may reduce a width of the increase in the load as the load approaches the specified load in the process of sequentially increasing the load (claim 5).

If the maximum output point is known, the output point of the solar cell can be maintained in a relatively high output area over a relatively long period of time, in the one control period defined by the measure of increasing the load by the first controlling device and the measure of rapidly reducing the load by the second controlling device, by reducing the width of the increase in the load in a binary, gradual, or continuous manner as the output point approaches the maximum output point (i.e. qualitatively, by changing the load relatively slowly in the load area in the vicinity of the maximum output point in the increase area).

Alternatively, in an aspect in which the specifying device is provided, the first controlling device sequentially increases the load such that the load is a target load corresponding to the specified load in the process of sequentially increasing the load (claim 6).

The operation characteristics of the solar cell, for example, such as the maximum output and IV characteristics, are influenced in no small part by the drive condition of the solar cell, for example, such as a sunshine condition and a temperature condition, whereas there can be also such a drive condition that allows an almost stable state of the solar cell. According to this aspect, for example, under the condition that the operation characteristics of the solar cell are almost stable or the like, the target load (which is of course a load corresponding to the maximum output point or a load which is less than the maximum output point) is set in accordance with the specified maximum output point, and the load is sequentially increased toward the target load. At the same time, the load is maintained at this target load after reaching the target load. Thus, it is possible to extract relatively high output from the solar cell for a relatively long period of time, which is preferable.

At this time, considering that the maximum output is extracted from the solar cell all the time, the target load may be the maximum output point (which means, as described above, the load which provides the maximum output). Alternatively, if it is tried to avoid the rapid drop in the output immediately after the output point is on the high-load side beyond the maximum output point, the target load may be a load point which is on the lower-load side than the maximum output and which is in the vicinity of the maximum output point. At this time, the wording "vicinity" may mean being away from the maximum output point by the amount of offset which can be provided on the basis of experiments, experiences, theories, simulations or the like in advance in order to ensure robustness with respect to constant load variation or output variation by a minor change, noise, or the like in the drive condition.

Incidentally, in the solar cell in which the output voltage rapidly decreases as soon as the output point reaches the high-load side beyond the maximum output point, an irregular change in the maximum output can cause the rapid drop in the output if the output point becomes an output point on the higher-load side than the maximum output point at that time point. In this case, obviously, the measure of rapidly reducing the load is taken by the operation of the second controlling device, and the load is sequentially increased again by the operation of the first controlling load. Thus, there is no problem in practice.

Incidentally, in the drive condition that there can be a frequent change in the operation characteristics of the solar cell as described above, basically, one control process including the operation of increasing the load in the first controlling device and the operation of rapidly reducing the load in the second controlling device is desirably repeated with a constant or irregular period. This period may be defined as a period which can adapt to the latest state of the solar cell, practically sufficiently, on the basis of experiments, experiences, theories, simulations, or the like in advance. Alternatively, it may be synchronized with a process period or the like on hardware associated with the specifying device.

Incidentally, in an aspect in which the load control according to the target load is performed, the target load may be set on a lower-load side than the specified load (claim 7).

As described above, the operations of the solar cell are unstable at output points in the vicinity of the maximum output point in some solar cells. However, according to this aspect, the load is maintained in an area in which the operation is relatively stable on the lower-load side than the maximum output point, so that the output can be stably extracted from the solar cell, which is useful in practice.

In another aspect of the output control apparatus of the solar cell of the present invention, it is further provided with a load varying device capable of changing the load, the first controlling device sequentially increasing the load by controlling said load varying device, the second controlling device rapidly reducing the load by controlling said load varying device (claim 8).

According to this aspect, as one part of the output control apparatus of the solar cell, there is provided the load varying device as a mechanism for changing the load, for example, physically, mechanically, electrically or chemically. The first and second controlling devices can realize the operation of each device by the control of the load varying device.

Incidentally, in an aspect in which the load varying device is provided, the load varying device may change the load in accordance with an electrification state (claim 9).

According to this aspect, the load varying device is constructed as a chopper circuit or the like, including a switching element, such as a transistor, and an electron holding device, such as a capacitor. In this case, for example, in accordance with various electrification states including the switching state of the transistor element or the like, the load can be increased, accurately and quickly, which is preferable.

Alternatively, in an aspect in which the load varying device is provided, the load varying device may include a short-circuit device for short-circuiting the solar cell (claim 10).

Depending on the physical or electrical structure of the load varying device, although the second controlling device rapidly reduces the load of the solar cell in terms of control, the decrease in the load viewed from the solar cell is slow in some cases. In such a case, it is possible to assist in the operation of the second controlling device in which the load is rapidly reduced, by directly short-circuiting the solar cell, which makes it more certain to extract the output from the solar cell, efficiently.

The operation and other advantages of the present invention will become more apparent from the embodiment explained below.

BEST MODE FOR CARRYING OUT THE INVENTION

<Embodiment of the Invention>

Hereinafter, a preferred embodiment of the present invention will be explained with reference to the drawings.

<Structure of Embodiment>

Figure 1:
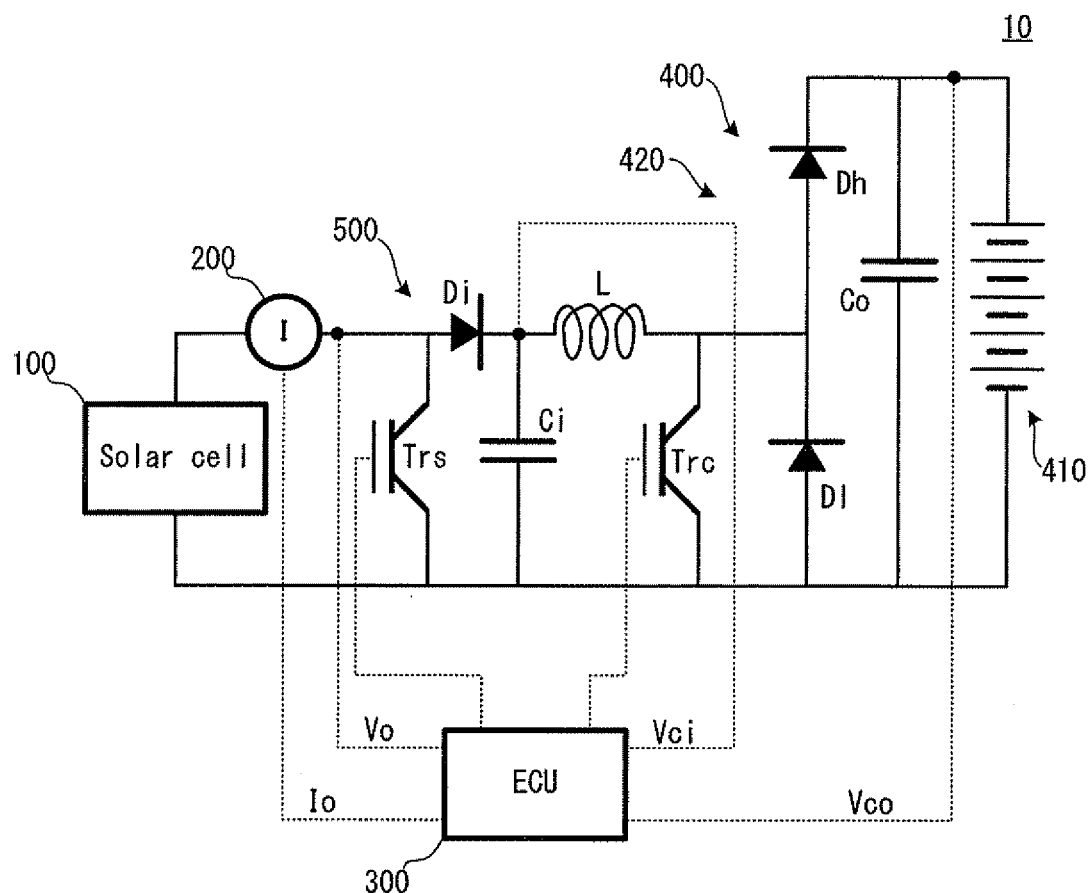
FIG. 1 is a block diagram showing a solar cell system in an embodiment of the present invention.

Firstly, with reference to FIG. 1, an explanation will be given on the structure of a solar cell system 10 in this embodiment. FIG. 1 is a conceptual view showing the structure of the solar cell system 10.

In FIG. 1, the solar cell system 10 is a system provided with a solar cell 100, a current sensor 200, an ECU 300, a load apparatus 400, and a short circuit 500.

Figure 2:
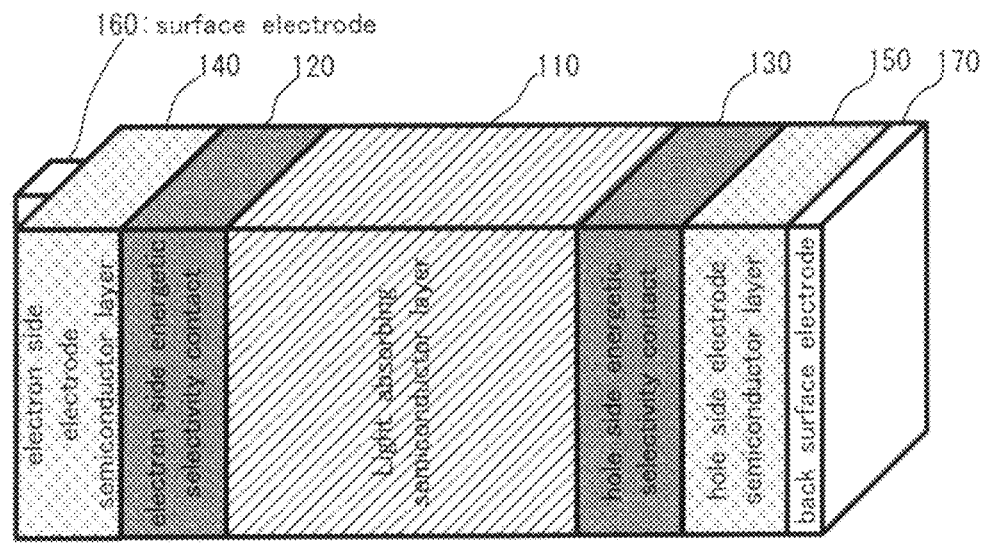
FIG. 2 is a schematic configuration diagram showing a solar cell provided for the solar cell system in FIG. 1.

The solar cell 100 is a hot carrier solar cell as one example of the "solar cell" of the present invention. Now, with reference to FIG. 2, the structure of the solar cell 100 will be explained. FIG. 2 is a schematic configuration diagram showing the solar cell 100. Incidentally, in FIG. 2, the overlap points with FIG. 1 will carry the same reference numerals, and the explanation thereof will be omitted as occasion demands.

In FIG. 2, the solar cell 100 has a light-absorbing semiconductor layer 110 with a relatively narrow band gap, and it has such a structure that the light-absorbing semiconductor layer 110 is sandwiched between an electron-side energetic selectivity contact 120 and a hole-side energetic selectivity contact 130, which transmit only carriers (electrons and holes) having a particular energy.

The electron-side energetic selectivity contact 120 is connected to a surface electrode 160 via an electron-side electrode semiconductor layer 140. Moreover, the hole-side energetic selectivity contact 130 is connected to a back surface electrode 170 via a hole-side electrode semiconductor layer 150. Each of the electrode semiconductor layers is a semiconductor layer for smoothly producing an electrical connection between the energetic selectivity contact and the electrode. Incidentally, in the solar cell 100, the energetic selectivity contact is formed on the electron side and the hole side; however, the energetic selectivity contact may be disposed only on the electron side.

Here, the basic operation of the hot carrier solar cell will be briefly explained. In the hot carrier solar cell, as opposed to a PN junction solar cell using PN junction, an excess energy is maintained for a relatively long time, wherein the excess energy exceeds the band gap correspondence value of a semiconductor owned by the carriers immediately after they are generated by light absorption. Moreover, the carriers collide with each other, and the solar cell is maintained in a high-temperature state of several thousands to several hundreds K.

The electron-side energetic selectivity contact 120 and the hole-side energetic selectivity contact 130 selectively transmit only the carriers having a particular energy (also referred to as an energy selection level) of the aforementioned carriers. As a result, each carrier is led to the electron-side electrode semiconductor layer 140 and the hole-side electrode semiconductor layer 150. Each electrode semiconductor layer is designed such that its Fermi level is closed to the particular energy, and the carriers extracted to each electrode semiconductor layer are led to each electrode with rarely having an excess energy, and they become an output current.

Incidentally, the principle and the structure of the hot carrier solar cell are described, for example, in the non-patent document 1 described above. Therefore, in this specification, the further detailed explanation will be omitted in order to prevent a complicated explanation.

Back in FIG. 1, the current sensor 200 is a sensor capable of detecting an output current Io of the solar cell 100. The current sensor 200 is electrically connected to the ECU 300, and the detected output current Io is referred to by the ECU 100, as occasion demands.

The ECU 300 is provided with a CPU, a ROM (Read Only Memory), a RAM and the like. The ECU 300 is an electronic control unit capable of controlling all the operations of the solar cell system 10, and the ECU 300 is one example of the "first controlling device", the "second controlling device" and the "specifying device" of the present invention. The ECU 300 can perform output control described later, in accordance with a control program stored in the ROM.

The load apparatus 400 is an apparatus for extracting an electric power P (one example of the "output" of the present invention) from the solar cell 100, and it is one example of the "load varying device" of the present invention. The load apparatus 400 is provided with a rechargeable battery 410 and a chopper circuit 420. In the solar cell system 10, the electric power P (one example of the "output" of the present invention) is extracted from the solar cell 100 in accordance with a load RL (i.e. one example of the "load" of the present invention) of the load apparatus 400.

The rechargeable battery 410 is one of known various storage batteries which can be charged with the output P of the solar cell 100.

The chopper circuit 420 is provided with an input smoothing condenser Ci, a coil L, a transistor Trc, a rectifier Dh, a rectifier Dl and an output smoothing condenser Co. The chopper circuit 420 is a known booster circuit for boosting a chopper input voltage Vci to a chopper output voltage Vco. The transistor Trc repeats ON/OFF at a frequency sufficiently higher than a characteristic frequency determined by the coil L and the output smoothing condenser Co.

On the other hand, in the chopper circuit 420, a ratio Vco/Vci of the chopper output voltage Vco and the chopper input voltage Vci is expressed by 1+K, wherein K is a ratio Ton/Toff of an ON-time Ton and an OFF-time Toff of the transistor Trc.

Here, if the chopper output voltage Vco is increased, the output current of the chopper circuit 420 increases, and along with that, the output current Io of the solar cell 100 also increases. Thus, for the solar cell 400, increasing the load RL of the load apparatus 400 is equivalent to reducing K. In other words, K can be treated as the reciprocal of the load RL of the load apparatus 400. Therefore, the ECU 300 can control the load RL of the load apparatus 400 at a desired value by the control of the transistor Trc (one example of the aspect of "changing the load in accordance with an electrification state" of the present invention).

As described above, in the solar cell system 10 in the embodiment, the load of the rechargeable battery 410 as a narrowly-defined load is fixed, and the electric power P extracted from the solar cell 100 is controlled by changing the load RL of the load apparatus 400 viewed from the solar cell 100 depending on the control state of the chopper circuit 420.

The short circuit 500 is a circuit for short-circuiting the solar cell 100, which is disposed between the solar cell 100 and the chopper circuit 420 and which is provided with a rectifier Di and a transistor Trs. The short circuit 500 is one example of the "short-circuiting device" of the present invention.

The transistor Trs is a transistor which is electrically connected to the ECU 300 and which is controlled by the ECU 300. The transistor Trs is controlled in an OFF state in normal time, and it is controlled in an ON state only in requesting the short-circuit of the solar cell 100. If the transistor Trs is controlled in the ON state, the solar cell 100 will be in the short-circuit state.

The input smoothing condenser Ci provided for the chopper circuit 420 allows the stable operations of the shopper circuit 420 whereas it smoothes a change in the load RL viewed from the solar cell 100 side with respect to a rapid change in K described above. Thus, even if there is a need to short-circuit the solar cell 100, it is necessary to maintain such a state that K is substantially large (i.e. such a state that the load RL is small) until the input smoothing condenser Ci discharges. In a period in which K is maintained in a relatively large state corresponding to the short-circuit, the output point of the solar cell 100 significantly deviates from a maximum output point, resulting in a decrease in the extraction efficiency of the electric power from the solar cell 100. Moreover, the state that K is large means such a state that the chopper output voltage Vco is high, according to the aforementioned definition of K. It is not desirable to continue the state that the chopper output voltage Veo is high, for the rechargeable battery 410 as the load.

According to the short circuit 500, it can solve the problems and it enables the solar cell 100 to be transferred into the short-circuit state, quickly. Incidentally, the detecting points of the output current Io and an output voltage Vo of the solar cell 100 are located on the near side or front side of the rectifier Di, viewed from the solar cell 100.

<Operations of Embodiment>

Next, the operations of the embodiment will be explained.

<Mathematical Analysis Of Operations of Solar Cell 100>

Firstly, the operations of the solar cell 100 as the hot carrier solar cell will be mathematically analyzed. Incidentally, the description about this analysis is disclosed in the aforementioned non-patent document 2, and the details will be not mentioned here in order to prevent a complicated explanation. Note that a part of the reference numerals do not match the reference numerals in the embodiment described above because it is based on the description of the non-patent document 2.

Firstly, an output current Jext of the solar cell 100 is defined by the following equation (1).

[Equation 1]

$$J_{ext} = \int_{\varepsilon_g}^{\infty} d\varepsilon [j_{abs}(\varepsilon) - j_{em}(\varepsilon)] = J_{abs} - J_{em} \quad (1)$$

Moreover, Jabs($\varepsilon$) in the above equation (1) is defined by the following equation (2). Incidentally, $\Omega_{abs}$ in the equation (2) is the solid angle of sunlight, and it is defined by the following equation (3).

[Equation 2]

$$j_{abs}(\varepsilon) = \frac{2\Omega_{abs}}{h^3 c^2} \frac{\varepsilon^2}{\exp[\varepsilon/k_B T_s] - 1} \quad (2)$$

[Equation 3]

$$\Omega_{abs} = 6.8 \times 10^{-5} \quad (3)$$

In a loss Jem due to the recombination of the carriers, models defined by the following equations (4), (5) and (6) are adopted as the best case.

[Equation 4]

$$j_{em}(\varepsilon) = \frac{2\Omega_{em}}{h^3 c^2} \frac{\varepsilon^2}{\exp[(\varepsilon_e - \mu_e)/k_B T_e - (\varepsilon_h - \mu_h)/k_B T_h] - 1} \quad (4)$$

[Equation 5]

$$\varepsilon_e = \frac{\varepsilon_g}{2} + \frac{(\varepsilon - \varepsilon_g) m_h}{m_e + m_h} \quad (5)$$

[Equation 6]

$$\varepsilon_h = -\frac{\varepsilon_g}{2} - \frac{(\varepsilon - \varepsilon_g) m_e}{m_e + m_h} \quad (6)$$

The thermal energy balance of the carriers is given by the following equations (7), (8) and (9). Incidentally, in the following equations, Ee is the selection energy level of the energetic selectivity contact for selectively extracting the carriers having the particular energy described above. Moreover, Uabs means an energy supplied from the sun, Uem means an energy lost by the recombination of the carriers, and Uth means such a rate that the carriers gradually release heat and lose their energy.

[Equation 7]

$$J_{ext} E_e = U_{abs-3} - U_{em-e} - U_{th-e} \quad (7)$$

[Equation 8]

$$U_{abs-e} = \int_{\varepsilon_g}^{\infty} d\varepsilon \, \varepsilon \, j_{abs}(\varepsilon) \quad (8)$$

[Equation 9]

$$U_{em-e} = \int_{\varepsilon_g}^{\infty} d\varepsilon \, \varepsilon \, j_{em}(\varepsilon) \quad (9)$$

The above equations (1) to (9) are the same as equations (1) to (9) described in the non-patent document 2 described above; however there is room for improvement as for Uth, which is the rate when the carriers gradually release heat and lose their energy. In the model of the non-patent document 2 described above, the rate is determined by a time length in which the carriers remain until being extracted as the electric current. However, considering in that way, such a phenomenon that the extraction of the carriers from the energetic selectivity contact influences a carrier energy distribution, which further influences a thermal energy release from the carriers, is not correctly described. Moreover, there is also such a mathematical problem that carrier temperatures Te and Th cannot be determined.

Thus, as for the thermal energy release of the carriers, now, the applicant has newly established a model determined by the temperature of the carriers, defined by the following equation (10).

[Equation 10]

$$U_{th} = \frac{3k_B}{2\tau_{th}} \cdot d \cdot nc \cdot (T_e - T_{RT}) \quad (10)$$

On the other hand, a relation between an output energy Pe and an output voltage Ve is defined by the following equation (11). Incidentally, the following equation (11) is the same as an equation (13) in the non-patent document 2 described above.

[Equation 11]

$$P_e = J_{ext}(E_e - (E_e - \mu_e) T_{RT}/T_e) = J_{ext} V_e \quad (11)$$

A carrier distribution function adopts the following equation (12) as an appropriate model. Incidentally, the following equation (12) is the same as an equation (16) in the non-patent document 2 described above.

[Equation 12]

$$n_c = 8\sqrt{2\pi} \, m_e^{3/2} h^3 \int_{\varepsilon_g/2}^{\infty} d\varepsilon \sqrt{\varepsilon - \varepsilon_g/2} \times \frac{1}{\exp[(\varepsilon - \mu_e)/k_B T_e] + 1} \quad (12)$$

Moreover, a carrier density nc is defined as in the following equation (13) from a carrier retention time τre. Incidentally, d is the thickness of the light-absorbing semiconductor layer 110. Incidentally, the following equation (13) is the same as an equation (17) in the non-patent document 2 described above.

[Equation 13]

$$n_c = J_{abs} \tau_{re}/d \quad (13)$$

Here, the equations other than the equation (10) described above are diverted from the model described in the non-patent document 2; however, the equation (10) is a new model newly suggested by the applicant, so that the solution is not shown by the non-patent document 2.

The applicant has firstly provided the value of the carrier density nc in advance to obtain the carrier temperature Te from the equation (7) and the equation (10) described above. At this time, it is assumed that the carrier temperature Te of the electrons is equal to the carrier temperature Th of the holes and that each of an electron effective mass me and a hole effective mass mh is 0.4 times heavier than the electron in vacuum.

Then, the applicant has substituted the value of the carrier temperature Te into the right side of the equation (12) described above, and has searched for the value of μe such that the value of nc matches the value provided in advance. As a result, the applicant has found that the IV characteristics of the solar cell 100 as the hot carrier solar cell are significantly different from those of the conventional PN junction solar cell, as illustrated in FIG. 3.

Now, with reference to FIG. 3, the IV characteristics of the solar cell 100 will be explained. FIG. 3 is a diagram showing the IV characteristics of the solar cell 100.

Figure 3:
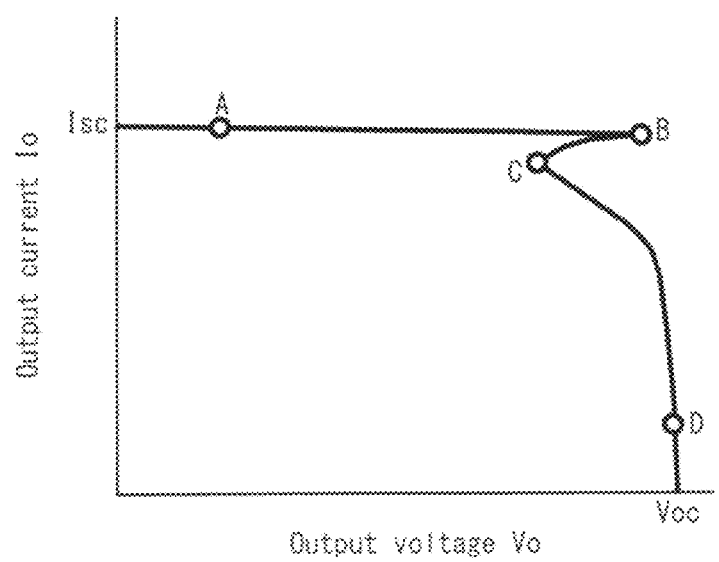
FIG. 3 is a diagram showing the IV characteristics of the solar cell in FIG. 2.

In FIG. 3, the vertical axis shows the output current Io of the solar cell 100, and the horizontal axis shows the output voltage Vo of the solar cell 100. The IV characteristics are shown in a solid line in FIG. 3.

As is clear from FIG. 3, the solar cell 100 as the hot carrier solar cell has a spike-like peak in the IV characteristics. More specifically, if the load RL is increased from an output point A on the low-load side, the output voltage Vo rapidly drops after an output point B. Incidentally, the vertical axis shows the electric current, so that the slope of a segment connecting the origin and the output point (refer to ○ in FIG. 3) of the solar cell 100 is the reciprocal of the load RL. Therefore, it means that as the slope increases, it is on the low-load side.

The output voltage Vo drops until reaching an output point C, increases again, and reaches an output point D on the high-load side.

As is clear from FIG. 3, the maximum output point of the solar cell 100 is the output point B (hereinafter referred to as a "maximum output point B" as occasion demands). incidentally, Isc in FIG. 3 is a short-circuit current, and Voc is an open voltage.

Here, the applicant explains this phenomenon as follows, on the basis of years of research.

In other words, in a load area from the output point A to the output point B, the carriers are quickly extracted via the energetic selectivity contact, and the carrier retention time is relatively short. Thus, the carrier temperature is maintained in a relatively high-temperature state. In this state, a Fermi level Efn of the electrode semiconductor layer 140 and a Fermi level Efp of the electrode semiconductor layer 150 are at different levels from an electron-side false Fermi level Efe and a hole-side false Fermi level Efh of the light-absorbing semiconductor layer 110, respectively, depending on a difference in the respective carrier temperatures.

Then, a positional relation in the false Fermi level between the electrons and the holes in the light-absorbing semiconductor layer 110 changes with respect to the carrier density in accordance with the equation (12) described above (as the carrier density is higher, Efe is higher and Efh is lower), so that the output voltage Vo increases.

However, if the carrier retention time increases in accordance with the equation (13) described above, the carrier temperature decreases. As a result, if the carrier density increases beyond the maximum output point B, the influence of the low carrier temperature becomes obvious in accordance with the equation (11) described above, and the output voltage Vo decreases. As a result, the output voltage Vo decreases to a value corresponding to the output point C.

On the other hand, the carrier temperature does not fall below a $T_{RT}$ which is an ambient temperature, so that the output voltage Vo naturally stops to decrease, and the output voltage Vo increases again due to the influence of the change in the positional relation in the false Fermi level between the electrons and the holes described above. Along with that, the output current Io remarkably decreases due to the recombination of the carriers, thereby reaching the output point D.

In an operation area from the output point C to the output point D, the carrier temperature is equal to the ambient temperature, so that the Fermi level of the electrode semiconductor layers 140 and 150 matches the false Fermi level of the light-absorbing semiconductor layer 110. In this area, the solar cell 100 no longer operates as the hot carrier solar cell and performs the same operations as those of the conventional PN junction solar cell. In the explanation below, an operation area from the output point A to the output point B (i.e. one example of the "increase area" of the present invention) is referred to as a "hot carrier operation area" as occasion demands, and the operation area from the output point C to the output point D is referred to as a "PN junction operation area" as occasion demands. Moreover, an operation area from the maximum output point B to the output point C is referred to as a "voltage decrease area" as occasion demands.

<Details of Output Control>

The output control for the solar cell 100 as the hot carrier solar cell shall take into account the IV characteristics unique to the hot carrier solar cell having the spike-like peak described above.

Figure 4:
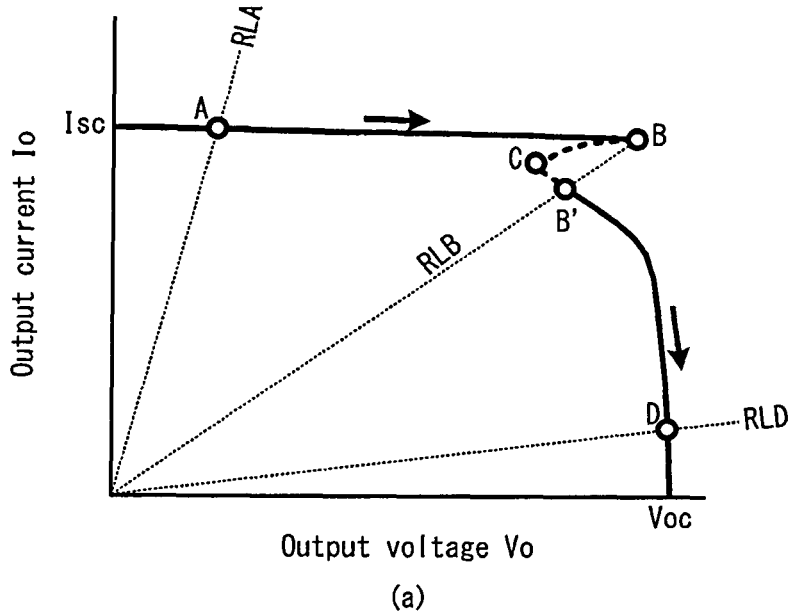
FIG. 4 are diagrams showing the transition of an output point in cases where a conventional maximum-power-point search method is adopted, in a comparative example of the embodiment.
Figure 4:
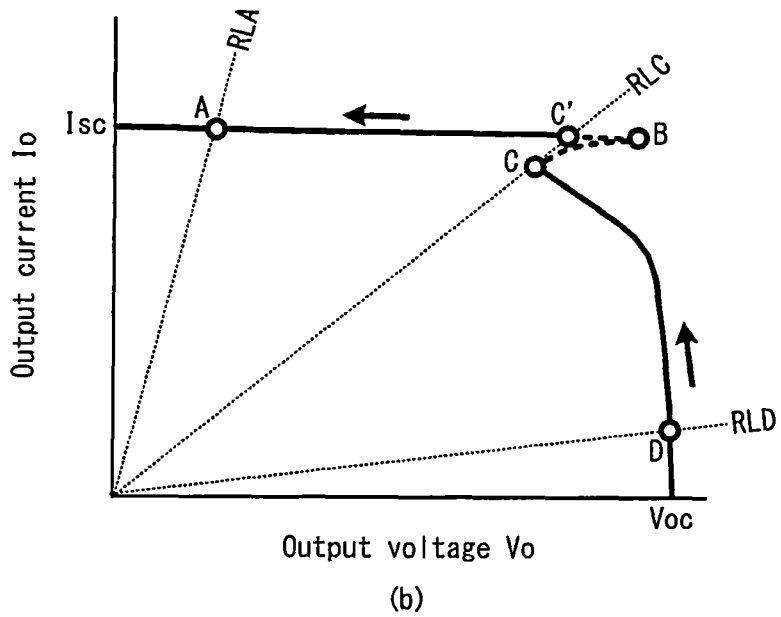

Now, the need for the output control will be explained with reference to FIG. 4. FIG. 4 are diagrams showing the transition of the output point in cases where a conventional maximum-power-point search method is adopted, in a comparative example of the embodiment. Incidentally, in FIG. 4, the overlap points with FIG. 3 will carry the same reference numerals, and the explanation thereof will be omitted as occasion demands.

In FIG. 4, the conventional maximum power point search method means, for example, hill climbing. In other words, it is a method of searching for the maximum power point while sweeping the load near the maximum power point by reversing the direction of change in the load if the output decreases, in the process of changing the load RL.

FIG. 4(a) shows a change in the output point of the solar cell 100 when the load RL is changed from a load point on the low-load side, which belongs to the hot carrier operation area, with respect to the solar cell 100.

In the process that the load is sequentially increased from the output point A corresponding to a load RLA, it is assumed that the maximum output point B corresponding to a load RLB (RLB>RLA) is obtained. As described above, with respect to the increase in the load after this, the output point enters the voltage decrease area. Thus, the output voltage Vout drops extremely.

On the other hand, it is clear from the drawings that it is hard to detect the voltage decrease area in an actual power control process. In other words, as soon as the load is increased from the maximum output point B, the output point of the solar cell 100 transits to an output point B' which is discontinuous in the waveform from the maximum power point B. After that, the output point moves in the PN junction operation area and reaches the output point D corresponding to a load RLD (RLD>RLB).

FIG. 4(b) shows a change in the output point of the solar cell 100 in the process that the load is reduced from the output point D. In other words, after the maximum output point B, the direction of change in the load RL is reversed because the tendency of decrease in the output is fixed, and the load is sequentially reduced from the load RLD.

If the load RL is sequentially reduced from the load RLD, the output point moves to the output point C, which is the end point of the PN junction operation area which corresponds to a load RLC (RLC<RLD). However, as soon as the load is reduced from the output point C, the output point transits to an output point C' which is discontinuous in the waveform from the output point C. After that, the output point moves in the hot carrier operation area and returns to the output point A. As described above, if the load is reduced from the output point on the higher-load side than the maximum output point B, the maximum output point B is not detected.

As a result, this type of conventional power control method, which does not take into account the spike-like peak characteristics unique to the hot carrier solar cell, has difficulty in reaching the maximum output point B, and even if it can detect the maximum output point B, a time loss reaching the detection can be large enough not to be ignored. As a result, the extraction efficiency of the electric power from the solar cell 100 is not sufficiently ensured.

Figure 5:
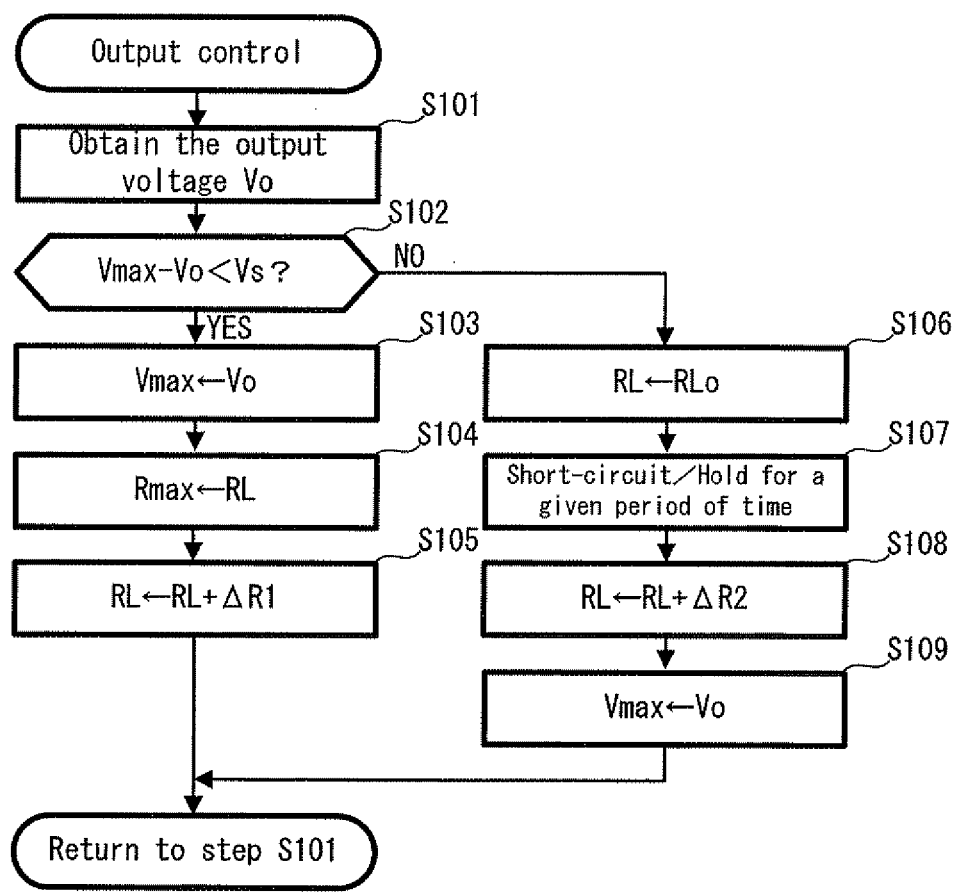
FIG. 5 is a flowchart showing output control performed by an ECU in the solar cell system in FIG. 1.

According to the output control in the embodiment, the problems can be solved, and the electric power can be extracted from the solar cell 100 highly efficiently. Now, with reference to FIG. 5, the details of the output control in the embodiment will be explained. FIG. 5 is a flowchart showing the output control.

In FIG. 5, the ECU 300 obtains the output voltage Vo (step S101).

After obtaining the output voltage Vo, the ECU 300 judges whether or not a voltage difference value obtained by subtracting the obtained output voltage Vo from a maximum voltage Vmax is less than a standard value Vs set in advance (step S102). The standard value Vs may be ideally zero, but it may be a positive value in a practical manner such that misclassification by noises can be prevented.

Incidentally, the extreme drop in the output voltage Vo in the voltage decrease area described above does not necessarily mean that the amount of decrease exceeds a standard value determined in advance. Therefore, instead of or in addition to the comparison with the standard value Vs, the time differential value of the output voltage Vo may be referred to.

Incidentally, in the embodiment, an output when the output voltage Vo shifts to the reduction side is set to be the maximum output. This is apparent, for example, from the IV characteristics illustrated in FIG. 3. From the viewpoint of searching for the maximum power point more strictly, the electric power P, which is the product of the output voltage Vo and the output current Jo, may be calculated with respect to the change in the load RL, and the maximum output point may be specified on the basis of the calculated electric power P.

The maximum voltage Vmax is the previous value of the output voltage Vo. Therefore, if an initial value is appropriately set (e.g. it may be zero), the judgment process in the step 5102 branches to a "YES" side until reaching the maximum output point (i.e. as long as the output voltage Vo keeps increasing).

If the voltage difference value is less than the standard value Vs (the step 8102: YES), the ECU 300 sets the output voltage Vo as the maximum voltage Vmax (step 5103) and stores the load RL at that time point as a maximum load Rmax (step S104).

If the maximum load Rmax is updated, the ECU 300 increases the load RL by a step width ΔR1 set in advance (step S105), and returns the process to the step S101. As described above, until the maximum output point (incidentally, here, the maximum output point is stored as the maximum load Rmax) is determined, the process from the step 101 to the step S105 is repeated. In other words, the process from the step 101 to the step S105 is one example of the operations of the "first controlling device" of the present invention.

On the other hand, if the output point of the solar cell 100 exceeds the maximum output point and the different value is greater than or equal to the standard value Vs (the step S102: NO), the ECU 300 instantly reduces the load RL to an initial value RLo (i.e. one example of the "initial load" of the present invention) (step S106). The initial value RLo is obviously on the lower load side than the current load RL which causes the decrease in the output voltage Vo, and it is a sufficiently small value at least with respect to the stored maximum load Rmax. In practice, the initial value RLo may be a small value corresponding to the short circuit. Incidentally, the step S106 is one example of the operations of the "second controlling device" of the present invention.

In synchronization with that the load RL is returned to the initial value RLo, the ECU 300 controls the transistor Trs of the short circuit 500 into the ON state to control the solar cell 100 in the short-circuit state, and the ECU 300 maintains the state for a given period of time such that the solar cell 100 certainly returns from the PN junction operation area to the hot carrier operation area (step S107).

Then, the ECU 300 increases the load RL from the initial value RLo (step S108). The step width in the step S108 may be the step width ΔR1 described above, but here, a step width ΔR2, which is greater than the step width ΔR1, is adopted. In other words, the initial value RLo is a load corresponding to an output point far on a short-circuit side with respect to the maximum output point, so that there is no problem even if the load is rapidly increased up to the output point on the high-load side to some extent, and that is more efficient to extract the electric power.

Incidentally, the step width ΔR2 may be determined on the basis of the maximum load Rmax stored at that time point. The IV characteristics of the solar cell 100 vary, to a greater or lesser degree in the scale, in most cases, depending on the operation conditions of the solar cell 100 such as a sunshine condition and a temperature condition. Therefore, there is no guarantee that the previous maximum load Rmax is a maximum load when the step S108 is performed, but it is also the fact that the previous maximum load Rmax is extremely reliable as a reference value.

Therefore, in increasing the load RL to a certain degree of high load area, if the step width ΔR2 is determined in accordance with various processes, for example, such as multiplying the maximum load Rmax by a proportion which is less than 1, or subtracting a predetermined value from Rmax, then, it is possible to ensure an operation period in the vicinity of the maximum output point.

If the load RL is increased by the step width ΔR2, the output voltage Vo corresponding to the load RL is newly set to the maximum value Vmax (step S109), and the process is returned to the step S101. The output control is performed as described above.

Figure 6:
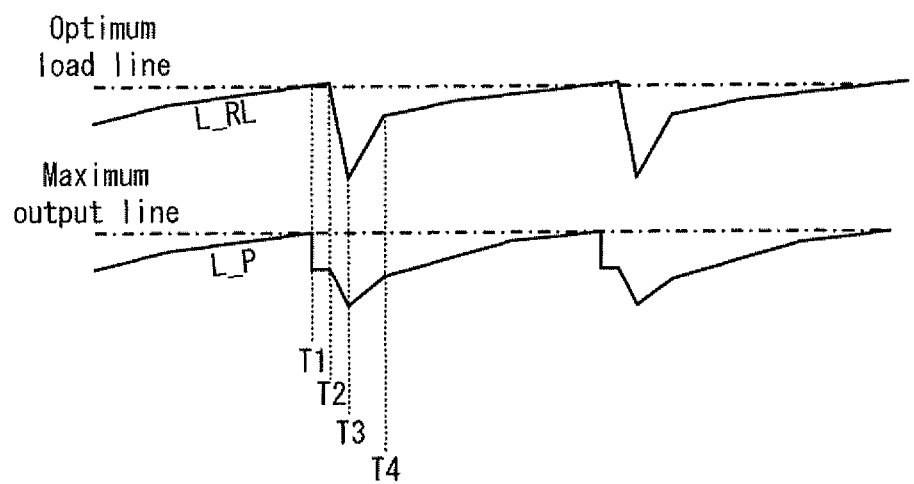
FIG. 6 is a timing chart showing one temporal transition of a load and output in the process of the output control in FIG. 4.

Next, with reference to FIG. 6, an explanation will be given on the temporal transition of the load and the output in the process of the output control described above. FIG. 6 is a timing chart showing one temporal transition of the load and the output in the process of the output control.

In FIG. 6, the temporal transition of the load RL is shown in the upper part, and the temporal transition of the output of the solar cell 100 is shown in the lower part.

Here, in FIG. 6, the maximum output is shown as a maximum output line (refer to an alternate long and short dash line), and an optimum load which provides the maximum output is shown as an optimum load line (refer to an alternate long and short dash line). The temporal transition of the load RL and the temporal transition of the output are as shown in L_RL and L_P in FIG. 6, respectively.

In other words, if the load RL reaches the optimum load, i.e. the load corresponding to the maximum output point at a time point T1, the output rapidly decreases at that moment. If the step S106 is started at a time point T2 and the load RL is set to the initial value RLo at a time point T3, the output increases in a relatively short time due to the effect of the step width ΔR2 until a time point T4. After that, the load is gradually increased by the step width ΔR1, reaching the maximum output point again. Basically, this is continued.

Figure 7:
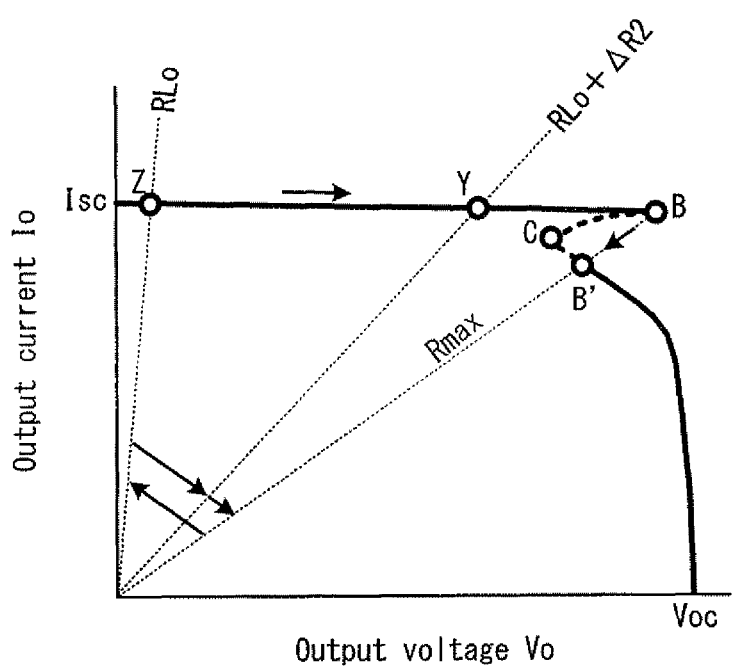
FIG. 7 is a diagram conceptually showing the transition of the load in the process of the output control in FIG. 4.

This is shown on the IV characteristics, as illustrated in FIG. 7. FIG. 7 is a diagram conceptually showing the transition of the load in the process of the output control.

In FIG. 7, if the output point changes from the maximum output point B to the output point B' with respect to a change in the load after the maximum load Rmax, the load RL is returned to the initial value RLo by the operation of the step S106, and the output point becomes an output point Z in FIG. 7.

On the other hand, the output point Z is significantly away from the maximum output point B, so that the ECU 300 significantly increases the load to RLo+ΔR2 by the step S108, and the output point changes from the output point Z to an output point Y. Then, in the process that the load RL is gradually increased in accordance with the step width ΔR1, the output point reaches the maximum output point B again.

As explained above, according to the output control in the embodiment, the load point corresponding to the maximum output point B of the solar cell 100 is adopted as one example of the "target load" of the present invention, and the load RL of the load apparatus 400 is controlled to sequentially increase from the load point in the hot carrier area (increase area) such that the output point of the solar cell 100 is the maximum output point B.

On the other hand, the behavior of the output voltage Vo with respect to a minor change in the load is delicate in the vicinity of the maximum output point, and it is hard to always maintain the output point of the solar cell 100 at the maximum output point B. Thus, the output point can often transit to the higher-load side than the maximum output point B. Even in that case, the following series of control processes is performed without delay; namely, the solar cell 100 is short-circuited by the short circuit 500, the load RL is instantly returned to the initial value RLo on the low-load side, and the target load (here, the load corresponding to the maximum output point) is aimed at while sequentially increasing the load RL to the high-load side.

Therefore, according to the embodiment, it is possible to certainly detect the maximum output point, which is never detected by the change in the load from the high-load side. Also, if a certain period of time is seen, it is possible to extent the period that the output point of the solar cell 100 is maintained in the vicinity of the target output point. In other words, it is possible to extract the output from the solar cell 100 highly efficiently.

Incidentally, such a configuration is merely one example of the practical aspect that can be adopted by the output control apparatus of the solar cell of the present invention. For example, a frequent shift from the hot carrier operation area to the PN junction operation area is not always desired in aiming at the efficient extraction of the electric power from the solar cell 100. In view of this point, the following control aspect can be also extremely useful in practice; namely, in cases where the maximum output point can be specified, a load point corresponding to the output point that is in the vicinity of the specified maximum output point and that is in the hot carrier operation area in which there is less concern about the transition to the PN junction operation area is used as the target load, and the load is controlled to gradually increase. In particular, in cases where the IV characteristics of the solar cell 100 do not significantly change or can be regarded to substantially not change at all, such an aspect is effective that the output point of the solar cell 100 is always maintained near the maximum output point.

Incidentally, in the output control in the embodiment, with the reset of the solar cell 100 in the step S107, the step width of the load RL is set to ΔR2 which is greater than ΔR1. This is one example of such an operation of the first controlling device that it "reduces a width of the increase in the load as the load approaches the specified load". As another example, as the load approaches the target load, the step width of the load may be controlled to the reduction side more gradually or continuously.

Incidentally, in the embodiment, the maximum output point of the solar cell 100 is specified; however, the maximum output point of the solar cell 100 is not necessarily clearly gauged when a practically useful effect is obtained which is associated with the output control apparatus of the solar cell of the present invention and which is efficiently extracting the output from the solar cell 100. In other words, it is possible to extract the output from the solar cell 100 highly efficiently, as long as including such an operation of the first controlling device of the present invention that the load is sequentially increased from a load which belongs to the increase area (the hot carrier area in the embodiment) in which the output increases with respect to the increase in the load and such an operation of the second controlling device of the present invention that the load is instantly rapidly reduced to the initial load in cases where the decrease in the output with respect to the increase in the load is detected.

Lastly, in the embodiment, the hot carrier solar cell is adopted as the solar cell of the present invention. As described above, the hot carrier solar cell has the spike-like peak in the IV characteristics, so that the maximum output point detected with respect to the direction of change in the load remarkably changes. Thus, it is extremely preferable as a target to which the output control described above is applied. However, a series of operation processes associated with the output control apparatus of the solar cell of the present invention, which adopts the output control described above as one example, can be also applied as output control with respect to another solar cell. That is because as long as it is such a solar cell that the output is robust with respect to the direction of change in the load, there will be no problem even if it is defined to change the load from the low-load side to the high-load side in the first place. In other words, the present invention is useful in practice in that the efficient extraction of the output can be realized with respect to a broader range of types of solar cells.

The present invention is not limited to the aforementioned embodiment, but various changes may be made, if desired, without departing from the essence or spirit of the invention which can be read from the claims and the entire specification. An output control apparatus of a solar cell, which involves such changes, is also intended to be within the technical scope of the present invention.

INDUSTRIAL APPLICABILITY

The present invention can be applied to output control when output is extracted from a solar cell.

10 solar cell system
100 solar cell
200 current sensor
300 ECU
400 load apparatus
410 rechargeable battery
420 chopper circuit
500 short circuit

The invention claimed is:

1. An output control apparatus for use with a solar cell for controlling an output of the solar cell, the solar cell being configured to operate at an output point in an increase area or a transient load area in accordance with a load where: (i) the increase area is an area in which an output of the solar cell increases as the load increases;

and (ii) the transient load area is an area in which (ii-1) an output voltage of the solar cell rapidly decreases at a load point which is a higher-load side than a first maximum output point of the solar cell and which is in the vicinity of the first maximum output point, and (ii-2) the output voltage of the solar cell rapidly increases after the rapid decrease of the output voltage of the solar cell in the vicinity of the first maximum output point, said output control apparatus comprising:

a first controlling device configured to sequentially increase the load in the increase area to the first maximum output for extracting the output from the solar cell;

a detecting device configured to detect a decrease in the output from the solar cell with respect to the increase in the load in a process of sequentially increasing the load, the decrease in the output from the solar cell being caused by the output point of the solar cell transiting from the increase area to the transient load area; and a second controlling device including a short circuit configured to short-circuit the load to an initial load in the increase area such that the output point of the solar cell returns from the transient area to the increase area, wherein:

said first controlling device being configured to sequentially increase the load again after the load is short-circuited to the initial load by the second controlling device, and a second maximum output of the solar cell when the load is changed from a high-load side to a low-load side is smaller than the first maximum output of the solar cell when the load is changed from the low-load side to the high-load side.

2. The output control apparatus of the solar cell according to claim 1, wherein the solar cell is a hot carrier solar cell.

3. The output control apparatus of the solar cell according to claim 1, further comprising:

a specifying device for specifying the load which causes the decrease in the output from the solar cell.

4. The output control apparatus of the solar cell according to claim 3, wherein said first controlling device reduces a width of the increase in the load as the load approaches the specified load in the process of sequentially increasing the load.

5. The output control apparatus of the solar cell according to claim 4, wherein said first controlling device sequentially increases the load such that the load is a target load corresponding to the specified load in the process of sequentially increasing the load.

6. The output control apparatus of the solar cell according to claim 3, wherein said first controlling device sequentially increases the load such that the load is a target load corresponding to the specified load in the process of sequentially increasing the load.

7. The output control apparatus of the solar cell according to claim 6, wherein the target load is set on a lower-load side than the specified load.

8. The output control apparatus of the solar cell according to claim 1, further comprising:

a load varying device capable of changing the load, said first controlling device sequentially increasing the load by controlling said load varying device, said second controlling device rapidly reducing the load by controlling said load varying device.

9. The output control apparatus of the solar cell according to claim 8, wherein said load varying device changes the load in accordance with an electrification state.

10. The output control apparatus of the solar cell according to claim 1, wherein the first controlling device is configured to increase the load to the first maximum output for the solar cell having a spike-like corrugated portion in an IV characteristic of the solar cell.

* * * * *